United States Patent
Rietzler et al.

[15] 3,656,859
[45] Apr. 18, 1972

[54] REAMER WITH REVERSIBLE BLADE

[72] Inventors: Erich Rietzler, Sigmaringen; Dieter Kress, Aalen, both of Germany

[73] Assignee: Mapal Dr. Kress KG, Aalen, Germany

[22] Filed: Aug. 24, 1970

[21] Appl. No.: 66,550

[30] Foreign Application Priority Data

Aug. 23, 1969 Germany.....................P 19 42 955.1

[52] U.S. Cl...............................408/179, 408/181, 408/185, 408/200
[51] Int. Cl..........................................................B23d 77/04
[58] Field of Search..................408/153, 175, 181, 185, 200

[56] References Cited

FOREIGN PATENTS OR APPLICATIONS 917,702  9/1946  France.................................408/153

Primary Examiner—Francis S. Husar
Attorney—Kelman and Berman

[57] ABSTRACT

A cutter head for a reamer carrying a reversible blade having multiple cutting edges, the blade being adjusted both in the direction of the axis of rotation and radially thereto by abutting engagement of an inactive cutting edge with a cam face on a sleeve which is adjusted radially in a bore of the cutter head.

7 Claims, 9 Drawing Figures

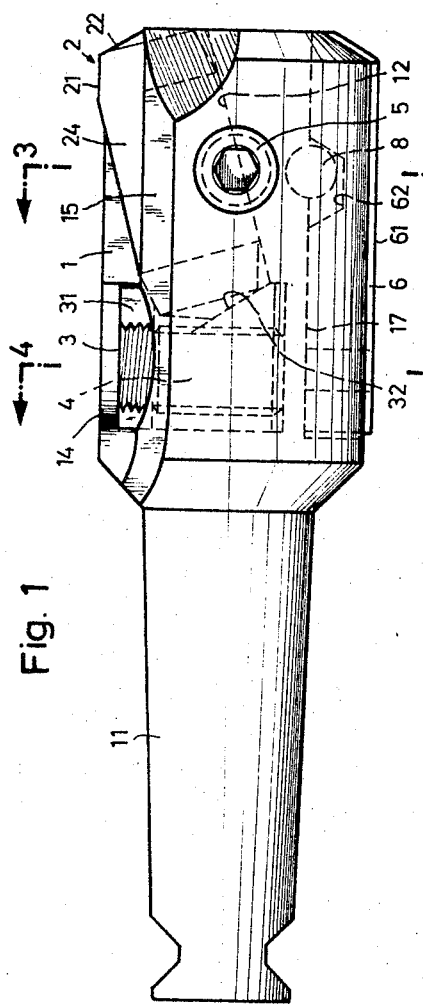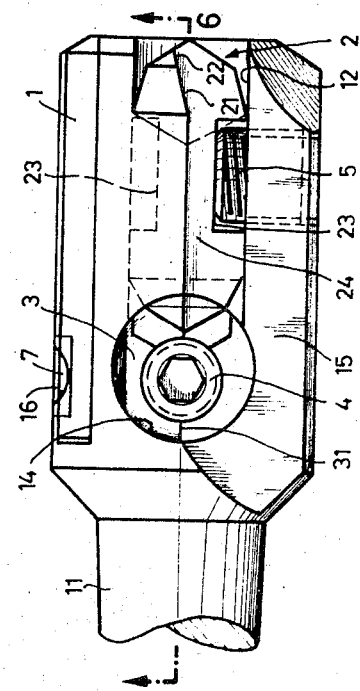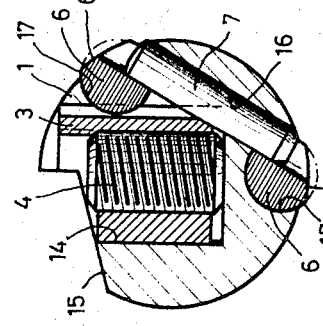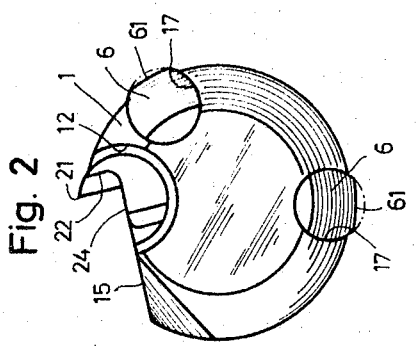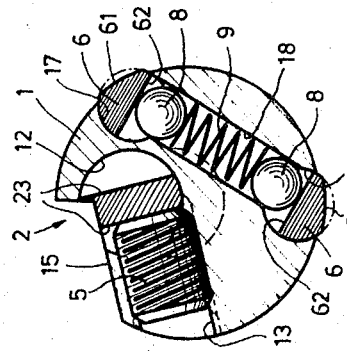

Fig. 6
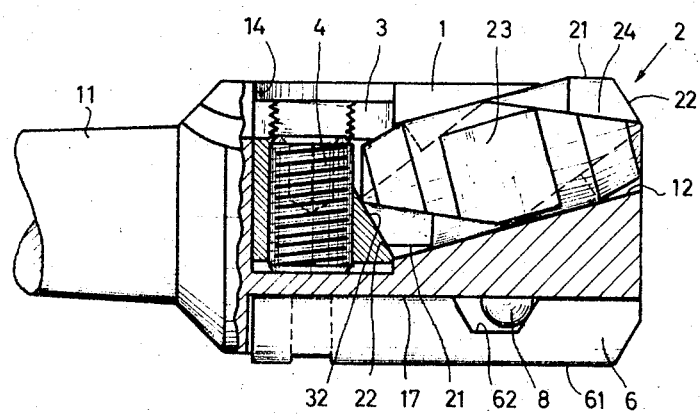
Fig. 8
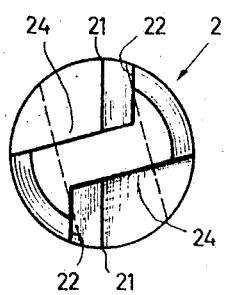
Fig. 7
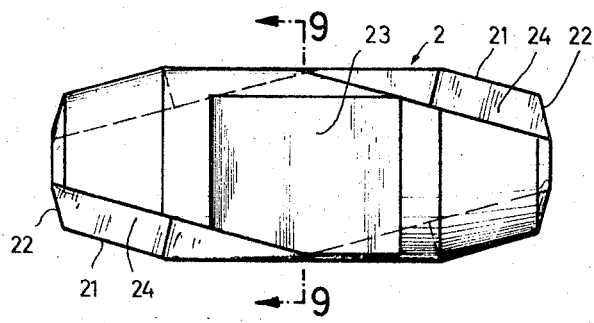
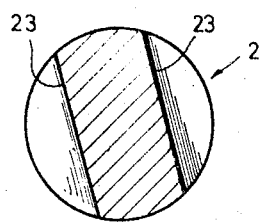
Fig. 9

REAMER WITH REVERSIBLE BLADE

This invention relates to cutter heads for reamers having releasably mounted blades, and particularly to a cutter head in a reamer equipped with a reversible blade.

Known cutter heads of the general type referred to require two adjusting screws for setting the radial distance between the cutting edge and the axis of cutter head rotation and for adjusting the angle between the cutting edge and the axis. The known cutter heads are relatively complex and correspondingly costly to manufacture, and they also are relatively difficult to set.

The primary object of the invention is the provision of a cutter head for a reamer equipped with a blade having multiple cutting edges, but capable of being adjusted and set in a simple manner without losing any of the desirable features of the known devices.

Such simple adjustment is made possible in the reamer of the invention by the use of a blade having a longitudinal axis and an axially central section whose face is substantially cylindrical and conformingly engages the cutter head in a recess of the head which receives the blade. Respective sections of the blade which extend axially from the central section toward the two ends of the blade have each a first frustoconical face portion of relatively small apex angle adjacent the central section and a second frustoconical face portion extending from the first portion outward and having a greater apex angle.

The axially terminal parts of the blade are each formed with axially elongated grooves or flutes which intersect the frustoconical face portions to define a substantially straight smoothing edge with the intersected first face portion and a principal cutting edge with the intersected second face portion.

The blade is normally secured in the recess of the cutter head by threaded securing devices. When so secured, the axis of cutter head rotation and the blade axis define a first angle not greater than a second angle defined by each smoothing edge and the axis of the blade, nor smaller by more than 2° than the second angle. The principal cutting edge and the blade axis preferably define an angle of approximately 75°.

Other features, additional objects, and many of the attendant advantages of this invention will readily become apparent from the following detailed description of a preferred embodiment of the invention when considered in connection with the appended drawing in which:

FIG. 1 shows the cutter head and associated elements of a reamer tool according to this invention in side elevation;

FIG. 2 shows the apparatus of FIG. 1 in front view;

FIG. 3 and 4 respectively illustrate the apparatus of FIG. 1 in front-elevational sections on the lines 3—3 and 4—4;

FIG. 5 is a top plan view of the apparatus of FIG. 1;

FIG. 6 shows the apparatus of FIG. 5 in side elevational section on the like 6—6;

FIG. 7 shows the blade of the apparatus of FIG. 1 in a corresponding view on a larger scale;

FIG. 8 is a frontal view of the blade of FIG. 7; and

FIG. 9 shows the blade of FIG. 7 in front elevational section on the line 9—9.

Referring now to the drawing in detail, there is seen a cutter head 1 coaxially and integrally mounted on a reduced shank 11 for rotation about the common axis when the head is mounted on the drive of the reamer, not otherwise shown. A cylindrical bore 12 obliquely inclined in the head 1 relative to the axis of rotation at a small acute angle of about 15° is radially open over its entire length and receives a blade 2. Another bore 13 (FIG. 3) extends from the circumference of the cutter head 1 at right angles to the axis of the bore 12 and receives a clamping screw 5. An additional, radial bore 14 in the cutter head (FIG. 4) slidably receives a sleeve 3 having an eccentric threaded bore and receiving a set screw 4 in the bore.

Two axial grooves 17 in the outer, generally cylindrical circumference of the cutter head 1 have cylindrically arcuate walls about their longitudinal axes and are connected by a transverse bore 16. Guide ribs 6 of basically cylindrical, identical shape are movably received in the grooves 17. The angular positions of the ribs 6 are secured by a locating pin 7 in the bore 16 whose ends engage respective recesses in the ribs 6 with sufficient clearance to permit some longitudinal movement of the ribs.

The ribs 6 are only partly received in the associated grooves 17, and each projecting rib portion is ground to a cylindrically arcuate face 61 coaxial with the cutter head 1 and shank 11 when the spacing of the face 61 corresponds to the nominal radius of the reamer tool.

As best seen in FIGS. 1, 3 and 6, each guide rib 6 has a notch or recess 62 which is open toward the corresponding notch of the other rib and is axially bounded by two cam faces obliquely inclined relative to the longitudinal rib axis, and connected by a face parallel to the rib axis. A steel ball 8 received in each notch 62 engages one of the cam faces and is biased by a helical compression spring 9 in a bore 18 connecting the grooves 17 to push the ribs 6 forwardly away from the shank 11 until their beveled front ends project from the front face of the cutter head about as far as the principal cutting edge of the blade 2, as will presently be discussed in more detail. The spring 9 is dimensioned to yield under axial working pressure and permit rearward movement of the ribs 6.

The blade 2, best seen in FIGS. 7 to 9, is elongated, and its longitudinally central section is basically cylindrical about the longitudinal blade axis. Two parallel flats 23 are ground in the cylindrical blade face and permit the blade to be clamped tight in the recess 12 in several positions, permitting reversal by 180° not only about the longitudinal axis of the blade, but also about a plane of symmetry corresponding to the section line 9—9 in FIG. 7.

Two axial sections of the blade on either side of the central, cylindrical section are frustoconical and have a small acute apex angle. A second short frustoconical face portion having an obtuse apex angle tapers from the first-mentioned frustoconical face portion to the end of the blade 2.

Two filters or grooves 24, which are axially elongated, are cut in each of the two axially terminal portions of the blade and intersect the frustoconical face portions to define two principal cutting edges 22 with each second frustoconical face portion. Each edge 22 is straight and inclined at an angle of about 75° to the longitudinal blade axis. The intersection of each flute or groove 24 with a frustoconical first face portion defines a smoothing edge 21 whose angle with the blade axis is about equal to the angle between the axis of rotation and the axis of the blade in the mounted and fixed condition. More precisely, the angle between the axis of rotation and the blade axis is not greater than the angle defined by each straight smoothing edge 21 and the blade axis, nor smaller by more than 2°.

Only one set of cutting edges 21, 22 is operative in each blade position, but each of the four sets may be brought to the operative position by reversing the blade. The flute or groove 24 associated with the operative blades 21, 22 communicates with a longitudinal flute or groove 15 in the cutter head 1 to facilitate the removal of chips from the cutting site.

The sleeve 3 is longitudinally slotted and has an oblique cam face 32 at the inner end of its slot 31. As is best seen in FIG. 1, the cam face 32 is obliquely inclined at a small acute angle relative to the axis of the threads in the sleeve 3 and inclined at an oblique angle of almost 90° to the axis of the blade 1 in the assembled device. The principal cutting edge 22 of the blade 2 which is at the far axial end from the operative edge 22 and 180° offset from the latter relative to the blade axis is received in the slot 31 and abuts against the cam face 32. When the clamping screw 5 is loosened, and the set screw 4 is turned clockwise, as viewed in FIG. 5, the sleeve 3 is moved outward of the bore 14, and the cam face 32 causes the blade 2 to move axially outward of the recess 12 so that the cutting edges 21, 22 are shifted both axially and radially relative to the axis of cutter head rotation.

During normal operation of the reamer partly shown in the drawing, the beveled front ends of the guide ribs 6 engage a workpiece simultaneously with the principal cutting edge 22, thereby supporting the cutting edge and preventing the chattering of the cutting edge which produces rough surfaces on the work. As reaming proceeds, the front ends of the ribs 6 are pushed back against the force of the spring 9 so that they are located a few tenths of a millimeter behind the operating principal cutting edge 22 of the blade 2. The pin 7 holds the ribs 6 in a position in which the distance of their arcuate faces 61 is equal to the nominal diameter of the reamer tool.

While a reversible blade having two principal cutting edges at each end has been illustrated and described, the invention is not limited to the illustrated number of principal cutting edges. A blade having three principal cutting edges and associated smoothing edges at each end has been found advantageous, and the necessary modifications of the illustrated device, including a corresponding number of flats 23, will be obvious to those skilled in the art.

It will be understood, therefore, that the invention is not limited to the embodiment chosen for the purpose of the disclosure, but that it is intended to cover all changes and modifications which do not depart from the spirit and scope of the invention defined in the appended claims.

What is claimed is:

1. In a reamer having a cutter head, shank means on said cutter head for rotating the cutter head about an axis of rotation, the head being formed with a recess extending in an axial plane, a blade having a plurality of cutting edges, and threaded securing means for releasably securing said blade in said recess in each of a plurality of operating positions relative to said cutter head, the improvement which comprises:
   a. said blade having an axis and being axially elongated,
      1. an axially central section of said blade having a substantially cylindrical face conformingly engaging said head in said recess,
      2. respective sections of said blade extending axially from said central sections toward the ends of said blade having each a first frustoconical face portion adjacent said central section and a second frustoconical face portion extending from said first portion in a direction away from said central section,
         1. the apex angle of each first frustoconical face portion being smaller than smoothing apex angle of the associated second frustoconical face portion,
      2. each axially terminal part of said blade being formed with an axially elongated groove intersecting said first and second frustoconical face portions,
      3. each groove and the intersected first face portion defining a substantially straight smoothing edge, and
      4. each groove and the intersected second face portion defining a principal cutting edge,
   b. said axis of rotation and said axis of the blade when secured by said securing means in each of said operating positions defining a first angle not greater than a second angle defined by each smoothing edge and said axis of the blade, nor smaller by more than 2° than said second angle.

2. In a reamer as set forth in claim 1, each principal cutting edge and said axis of the blade defining an angle of about 75°.

3. In a reamer as set forth in claim 1, said securing means including a sleeve having internal threads about an axis transverse to said axis of rotation and received in a bore of said cutter head for movement in the direction of said transverse axis, a threaded adjustment member received in said sleeve and abuttingly engaging said cutter head in said bore for limiting movement of said sleeve inward of said bore, said sleeve being formed with a slot and having a wall in said slot, said wall being obliquely inclined to the axis of said blade and to said transverse axis and abuttingly engaging one of said principal cutting edges in each of said operating positions of said blade, whereby said blade is axially shifted in said recess when said sleeve moves in said bore.

4. In a reamer as set forth in claim 1, said central section being formed with a flat in said face thereof, said securing means including a clamping screw threadedly movable in said cutter head transversely of said axis of said blade toward and away from said abutting engagement with said flat.

5. In a reamer as set forth in claim 4, said cutter head being formed with grooves elongated in the direction of said axis of rotation and each partly receiving a guide rail for axial movement, each guide rail having a face portion projecting from said groove and cylindrically arcuate about said axis of rotation.

6. In a reamer as set forth in claim 5, the portion of said guide rail received in said groove having a longitudinal axis and a face cylindrical about said longitudinal axis, and locating means received in a bore of said cutter head and engaging said guide rail for preventing rotation thereof about said longitudinal axis of the same.

7. In a reamer as set forth in claim 5, each guide rail being formed with a recess directed away from said projecting face portion and having a cam face in said recess obliquely inclined relative to the direction of elongation of the guide rail, and yieldably resilient cam engaging means engaging said cam face for biasing said guide rail toward a position in which a longitudinal end portion of said guide rail projects from said cutter head in the direction of said axis of rotation away from said shank means.

* * * * *